United States Patent
Bresnahan et al.

(10) Patent No.: US 10,202,131 B2
(45) Date of Patent: Feb. 12, 2019

(54) NOTIFICATIONS INVOLVED WITH ATTACHING OR DETACHING CONNECTABLE VEHICLES

(71) Applicant: HERE Global B.V., Eindhoven (NL)

(72) Inventors: Gregg Bresnahan, Wheaton, IL (US); Chris Dougherty, Highland Park, IL (US); Roland Gardner, Naperville, IL (US); David Mauer, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 22 days.

(21) Appl. No.: 15/190,415

(22) Filed: Jun. 23, 2016

(65) Prior Publication Data

US 2017/0370731 A1   Dec. 28, 2017

(51) Int. Cl.
*B61K 1/00* (2006.01)
*G01C 21/36* (2006.01)
(Continued)

(52) U.S. Cl.
CPC .............. *B61K 1/00* (2013.01); *G01C 21/34* (2013.01); *G01C 21/3626* (2013.01);
(Continued)

(58) Field of Classification Search
CPC ....... B61B 1/00; B61B 1/005; B61L 15/0045; B61L 27/04; B61L 2210/02; G08G 1/20;
(Continued)

(56) References Cited

U.S. PATENT DOCUMENTS 828,340 A * 8/1906 Rice ..................... B61B 13/00
104/20
3,416,684 A * 12/1968 Barry ..................... B60K 1/00
414/339
(Continued)

FOREIGN PATENT DOCUMENTS

DE     4118205 A1 * 12/1992 ............. B61B 13/00
DE    19745835 A1 *  4/1999 ............. B61B 13/00
(Continued)

OTHER PUBLICATIONS

Andreasson, Ingmar J., "Personal rapid transit as feeder/distributor to rail", Centre for Traffic Research, Royal Institute of Technology (KTH), Revision date: Oct. 21, 2011, 14 pages, downloaded from: https://faculty.washington.edu/jbs/itrans/andreasson-rail-prt.pdf (Year: 2011).*

(Continued)

*Primary Examiner* — Behrang Badii
*Assistant Examiner* — David A Testardi
(74) *Attorney, Agent, or Firm* — Lempia Summerfield Katz LLC

(57) ABSTRACT

Navigation devices, systems, and methods for transmitting notifications to and/or receiving notifications from electronic devices associated with passengers of connectable vehicles are described herein. In one example, a method is provided for sending a notification regarding a planned detachment of a designated vehicle from a plurality of connected vehicles. The method includes receiving a navigation destination for a passenger of an initial vehicle, (Continued)

calculating a detachment time or detachment location of the designated vehicle from the plurality of connected vehicles based on the received navigation destination, and transmitting a personalized notification to an electronic device associated with the passenger regarding the detachment time or detachment location of the designated vehicle from the plurality of connected vehicles.

20 Claims, 7 Drawing Sheets

(51) Int. Cl.
  *H04W 4/02* (2018.01)
  *G01C 21/34* (2006.01)
  *G08G 1/123* (2006.01)
(52) U.S. Cl.
  CPC ......... *G01C 21/3697* (2013.01); *G08G 1/123* (2013.01); *H04W 4/02* (2013.01)
(58) Field of Classification Search
  CPC ........ G08G 1/22; G08G 1/123; G07C 5/0816; G01C 21/3697; H04W 4/02; H04W 4/046; B61K 1/00; G05D 1/0027; G05D 1/0287
  See application file for complete search history.

(56) References Cited

U.S. PATENT DOCUMENTS

| | | | | |
|---|---|---|---|---|
| 3,759,187 | A * | 9/1973 | Gayot | B61B 13/00 104/130.07 |
| 3,791,304 | A * | 2/1974 | Bardet | B61K 1/00 104/18 |
| 3,839,964 | A * | 10/1974 | Gayot | B60F 1/00 104/18 |
| 3,848,533 | A * | 11/1974 | Grow | B61K 1/00 104/18 |
| 5,623,260 | A * | 4/1997 | Jones | G08G 1/123 340/988 |
| 5,775,227 | A * | 7/1998 | Mullen | B30B 15/304 104/244 |
| 6,129,025 | A * | 10/2000 | Minakami | B60L 5/005 104/288 |
| 6,356,820 | B1 * | 3/2002 | Hashimoto | G08G 1/22 180/167 |
| 6,380,872 | B1 * | 4/2002 | Yun | G08G 1/20 340/994 |
| 7,302,319 | B2 * | 11/2007 | Wu | B61L 27/04 104/27 |
| 8,188,859 | B1 * | 5/2012 | Emigh | G06Q 10/109 340/539.13 |
| 9,010,253 | B2 * | 4/2015 | Barry | B61F 13/00 105/215.2 |
| 9,227,639 | B1 * | 1/2016 | Bryant | B61L 3/00 |
| 2003/0182183 | A1 | 9/2003 | Pribe | |
| 2004/0068361 | A1 | 4/2004 | Cross et al. | |
| 2005/0039629 | A1 * | 2/2005 | Mayer | B61K 1/00 104/20 |
| 2010/0078962 | A1 | 4/2010 | Kronenberg | |
| 2010/0276216 | A1 * | 11/2010 | Barry | B60P 3/34 180/14.2 |
| 2010/0307368 | A1 * | 12/2010 | Parsley | B61K 1/00 104/20 |
| 2014/0372498 | A1 | 12/2014 | Mian et al. | |
| 2015/0191186 | A1 * | 7/2015 | Lucisano | B61L 27/04 701/2 |
| 2017/0349190 | A1 * | 12/2017 | Deutchnnan | B61L 27/0077 |
| 2018/0022405 | A1 * | 1/2018 | Gecchelin | B60D 1/36 701/23 |

FOREIGN PATENT DOCUMENTS

| | | | | |
|---|---|---|---|---|
| DE | 10140898 | A1 * | 6/2002 | .............. B61B 1/00 |
| DE | 102007038345 | A1 * | 9/2008 | .............. B61B 1/00 |
| GB | 2322725 | A * | 9/1998 | ............. G08G 1/123 |
| JP | 09009403 | A * | 1/1997 | |
| JP | 2003288393 | A * | 10/2003 | |
| WO | WO-01/81146 | A1 * | 11/2001 | |
| WO | WO-2013/003911 | A1 * | 1/2013 | |
| WO | WO-2016/108785 | A1 * | 7/2016 | |

OTHER PUBLICATIONS

Batelaan, Justin, "Express Guideway Transit: A case for further development in transit automation", Journal of Advanced Transportation, vol. 36 No. 2, 2002, pp. 157-167 (Year: 2002).*

Irving, Jack H. et al., "Fundamentals of Personal Rapid Transit", Original Copyright 1978 by D.C. Heath and Company, 359 pages (Year: 1978).*

PriestmanGoode, "Britain's leading transport designer unveils the future for 21st century train travel", Press release, Dec. 2014, 2 pages, downloaded from: http://www.priestmangoode.com/wp-content/uploads/2014/12/PG-Moving-Platforms-Press-Release.pdf (Year: 2014).*

Raney, Steve et al., "Morgantown People Mover—Updated Description", TRB 111504, Jan. 2005, 12 pages. (Year: 2005).*

EPO machine translation of DE 19745835 (original German document published Apr. 22, 1999 (Year: 1999).*

SAE International, "Automated Driving Levels of Driving Automation Are Defined in New SAE International Standard J3016", Copyright © 2014 SAE International, 2 pages. (Year: 2014).*

* cited by examiner

NOTIFICATIONS INVOLVED WITH ATTACHING OR DETACHING CONNECTABLE VEHICLES

FIELD

The following disclosure relates to navigation devices and services, or more particularly, to navigation devices, services, and methods for providing notifications to and/or receiving notifications from passengers (e.g., electronic devices operated by passengers) of connectable vehicles.

BACKGROUND

As autonomous vehicles are adopted, several benefits may be realized. Vehicle collisions may be reduced because computers can perform driving tasks more consistently and make fewer errors than human operators. Traffic congestion may be alleviated because autonomous vehicles observe specified gaps between vehicles, preventing stop and go traffic. The reduced traffic and increased safety may lead to higher speed limits.

Autonomous vehicles may allow drivers to focus their attention elsewhere, such as working on a laptop, talking on a phone, or sleeping. Impaired people that may otherwise be unable to drive may be able to operate an autonomous vehicle. Parking options in urban errors may be improved because autonomous vehicles may drop off passengers and then park in a more remote location.

However, systems have not been refined that enable autonomous vehicles to interlock with each other to allow movement between vehicles and/or share goods/services being provided by other autonomously driving vehicles delivering goods and/or services.

SUMMARY

Navigation devices, services, and methods are provided for transmitting notifications to and/or receiving notifications from passengers (e.g., electronic devices operated by passengers) of connectable vehicles. In one embodiment, the method for providing a notification regarding a planned detachment of a designated vehicle from a plurality of connected vehicles includes receiving a navigation destination for a passenger of an initial vehicle. The method further includes calculating, by a processor, a detachment time or detachment location of the designated vehicle from the plurality of connected vehicles based on the received navigation destination. The method further includes transmitting, by the processor, a personalized notification to an electronic device associated with the passenger regarding the detachment time or the detachment location of the designated vehicle from the plurality of connected vehicles.

In another embodiment, a method for receiving a notification regarding a planned detachment of a designated vehicle from a plurality of connected vehicles includes sending, via an electronic device, a navigation destination of a passenger of an initial vehicle. The method further includes receiving on the electronic device, following a connection of the initial vehicle with at least one additional vehicle to provide the plurality of connected vehicles, a personalized notification regarding a detachment time or detachment location for the designated vehicle from the plurality of connected vehicles based on the navigation destination.

Apparatuses are also provided for processing transmission requests to connect vehicles with each other. In one embodiment, the apparatus comprises at least one processor and at least one memory including computer program code for one or more programs, wherein the at least one memory and the computer program code configured to, with the at least one processor, cause the apparatus to at least perform: (1) receive a transmission comprising a navigation destination for a passenger of a first vehicle and request to connect with at least one additional vehicle; (2) determine, based on the received navigation route, a second vehicle to connect with the first vehicle; (3) transmit, to an electronic device associated with the second vehicle, a request to connect the first vehicle and the second vehicle; and (4) receive a transmission from the electronic device associated with the second vehicle authorizing or declining the connection of the first vehicle and the second vehicle.

BRIEF DESCRIPTION OF THE DRAWINGS

Exemplary embodiments are described herein with reference to the following drawings.

DETAILED DESCRIPTION

Figure 1:
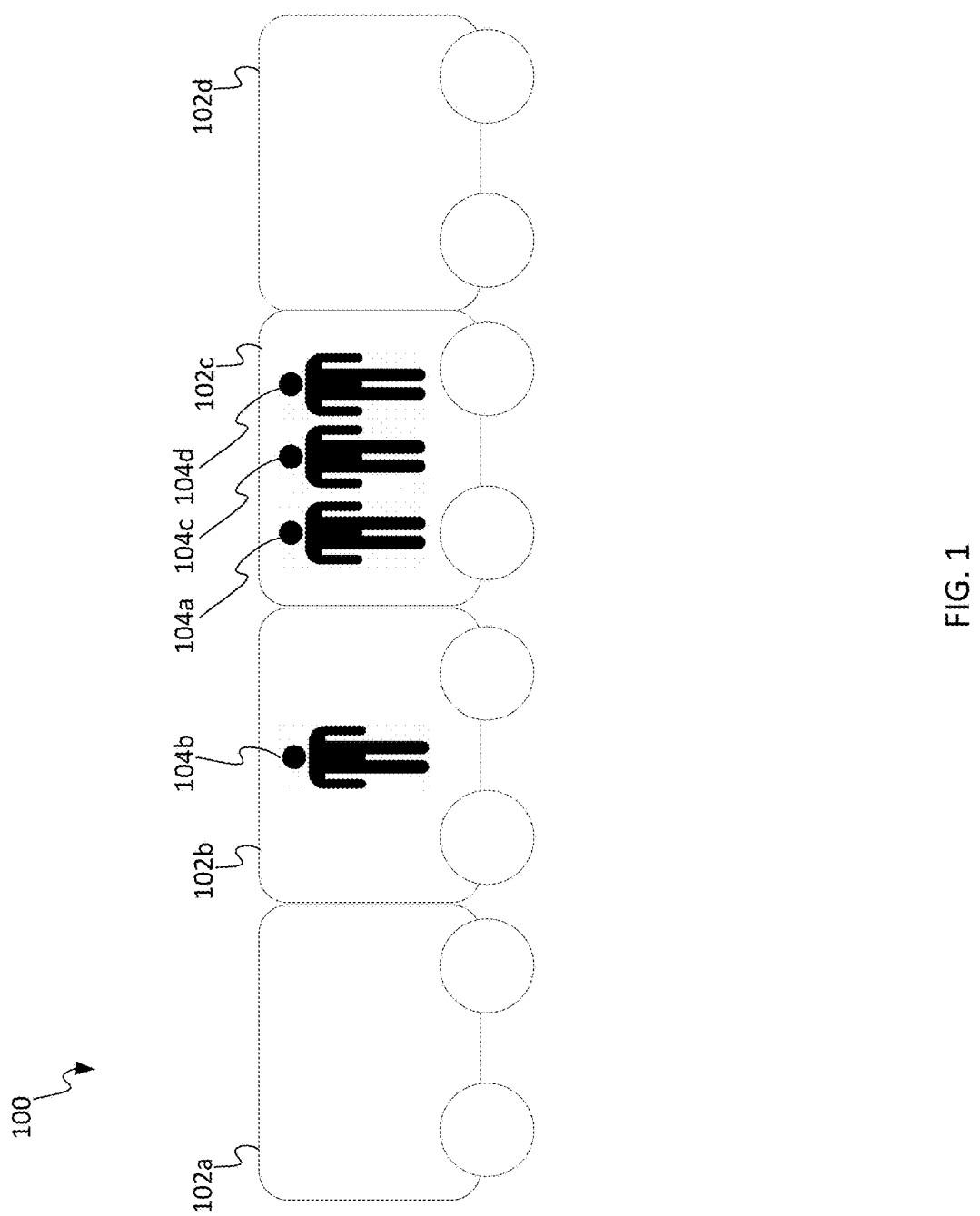
FIG. 1 illustrates an example of a plurality of connected vehicles and passengers that may travel between the connected vehicles.

As disclosed herein, navigation devices, systems, and methods for transmitting notifications to and/or receiving notifications from passengers (e.g., electronic devices operated by passengers) of connectable vehicles are provided.

As autonomous driving becomes more prevalent and requires little to no attention by the passenger, there will be an increased desire to connect with and move among other vehicles for social reasons and commerce while travelling. In other words, users or passengers may request to connect their vehicle with one or more additional vehicles traveling in a similar direction (e.g., commuting from one or more suburban areas into a city center or from a city center to one or more suburban areas). The passengers of the connected vehicles may be permitted to accept or deny the request for a passenger to join their caravan. After passengers or users of vehicles connect with other vehicles, the passengers of the vehicles may be able to move between vehicles to conduct meetings, socialize, or exchange goods or services with other users/passengers of the connected vehicles during their joint travel experience.

In certain cases, the final destination of one passenger is different from another passenger. Therefore, at some stage during the connected travel, a user or passenger may be provided a notification to return to a particular vehicle prior to a disconnection of one or more of the connected vehicles in order to continue their travel to their unique destination.

The devices, systems, and methods described herein are advantageous as they allow the ability for users or passengers of autonomous or highly automated driving vehicles the opportunity to connect with each other while traveling along a shared travel route for at least part of each passenger's route, therein allowing the opportunity of the passenger to connect with other users/passengers for social or commercial reasons.

The various devices, systems, and methods are described in further detail below.

I. Definitions

As described herein, a "notification" may refer to any type of electronic communication sent from one electronic device to another electronic device over a connected network. In certain examples, the notification may include instructions to a passenger of a vehicle regarding the connection or disconnection of a passenger's vehicle. In other examples, the notification may include a request to connect, an acceptance of a request to connect, or a denial of a request to connect a vehicle to one or more additional vehicles. In some examples, the notification may be a beacon wirelessly transmitted from one device to another that may include or be interpreted to include the proximity or location of an electronic device. In some examples, the beacon may include information such as a timestamp, received signal strength indicator (RSSI), or location information (e.g., an access point or global positioning coordinates). Such information may be provided in a Bluetooth Smart packet to provide a unique identifier.

As used herein, a "communication network" may refer to any wireless communication path between connected electronic devices. In certain examples, the communication network may be a personal area network (PAN), a near-me area network (NAN), or a local area network (LAN). In some examples, the communication network includes communication via radio wave frequencies. In one particular example, the communication network includes Bluetooth low energy (BLE) technology or a comparable technology configured to transmit small packets of information (as compared with Bluetooth Classic technology).

As described herein, a "connectable vehicle" may refer to any type of vehicle that is capable of being connected to another vehicle. This may include, but is not limited to, automobiles, trucks, and buses. In some examples, the vehicle is an autonomous vehicle or a highly automated driving vehicle. Connections may occur between the front and back of adjoining vehicles or between the sides of the adjoining vehicles. Alternatively, a connection may be made between vehicles by placing one vehicle on a surface of or within an opening of another vehicle (e.g., driving one vehicle onto a platform of another vehicle such as a car ferry).

As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicle may also include a completely driverless mode. Other levels of automation are possible.

As used herein, an "electronic device" may be a smart phone, a mobile phone, a personal digital assistant ("PDA"), a tablet computer, a notebook computer, a voice recognition device, a workstation, a server, a personal navigation device ("PND"), a portable navigation device, vehicle navigation system, wearable electronic device, and/or any other known or later developed mobile electronic device. In some examples, the electronic device may be any mobile device of interest to be monitored or tracked. For instance, wearable electronic devices, car keys, house keys, or even paper documents (e.g., a boarding pass) may be configured as an electronic device having an integrated circuit. Such a device may be embedded with an integrated circuit and may be wirelessly connected to another electronic device over a connected network to keep track of the device or the holder/passenger of the device. In some examples, the electronic device may be installed or transported in or on a vehicle (e.g., car, truck, motorcycle, bicycle, bus) or transported on a passenger or traveler. In certain examples, the electronic device generates a message that provides the device's geographic location and sends the message to a connected server over a communication network.

As used herein, a "wearable electronic device" may refer to an electronic device that may be worn on or attached to a person's body or clothing. The device may be attached to a person's shirt or jacket; worn on a person's wrist, ankle, waist, or head; worn over their eyes or ears; or attached to or inserted/embedded (e.g., subcutaneously) within the person's body. Such wearable electronic devices may include a watch, heart-rate monitor, activity tracker, or head-mounted display. In some examples, the wearable electronic device is an article of clothing embedded with an integrated circuit. The article of clothing may be, for example, a bracelet, a hat, gloves, a scarf, socks, shoes, pants, a shirt, or a jacket.

II. Requesting Connection with Another Vehicle

In the process of connecting a first or initial vehicle with one or more additional vehicles, a user may transmit a request to connect their initial vehicle with one or more additional vehicles. In this request, a user may provide a requested navigation destination. The user may physically or vocally input this information into an electronic device, such as a mobile phone, tablet computer, voice recognition device, or a navigation device installed within the vehicle. As noted above, the connectable vehicles may be autonomous or HAD vehicles.

The request to connect, with the navigation destination, may be transmitted from the electronic device associated with the initial vehicle to a service provider (e.g., a server) having a processor and memory over a connected network.

Following receipt of the request to connect, the processor may analyze the request and determine one or more potential vehicles with which to connect the initial vehicle. In some examples, the analysis may include a comparison of the requested navigation destination with the navigation destinations of the one or more additional vehicles. A potential match for the connection of vehicles may be based on a similar navigation destination, or at least a partial overlapping navigation route in a similar direction of the different destinations. In other examples, the potential match is determined based on user preferences to connect with specific passengers or users of other vehicles.

The comparison of potentially overlapping navigation routes may take into account similar road segments and/or nodes defined within a geographic database. The processor may compare the navigation routes of the various vehicles based on the road segments and/or nodes defined within each navigation route. The analysis of determining which vehicles to connect may be based on an identification of which vehicles include the largest number of overlapping road segments or nodes. In some cases, road segments or nodes may be weighted (e.g., travel along a same highway may have a higher score than a local road). In such an example, the comparison of overlapping navigation routes is based on a weighted score, wherein a connection may be made based on the highest scored route.

In some examples, the determination of which potential vehicles to connect may be based on which vehicles are within a predetermined radius or distance of the initial vehicle. For example, the processor may identify which potential connectable vehicles are within a radius (e.g., 1 kilometer, 2 kilometers, 5 kilometers, 10 kilometers, and so on), determine which of those identified vehicles are traveling to a similar destination or along an overlapping route, and analyze which vehicle(s) to send a request to connect based on the similar destination or overlapping route.

When a potential match is determined by the processor, the one or more additional vehicles may be notified of an upcoming connection with the initial vehicle or a request to connect to the initial vehicle. The notification may be transmitted by the processor over the connected network to one or more electronic devices associated with users or passengers of the one or more additional vehicles. In some examples, the transmission includes an inquiry to the passenger(s) to approve or decline the potential connection. This may be advantageous in allowing the passenger(s) to limit whom they connect with during their commute.

In some examples, the inquiry to other passengers is not required because the passenger of the initial vehicle has been preapproved to connect with the passengers of the additional vehicles. In other words, the approval of the request to connect may occur in advance of the request. For instance, a plurality of passengers or users may join a group of potential connected passengers (e.g., through a software application on a computing device), wherein each passenger may approve a requested connection with each of the other passengers in advance of any request to connect vehicles.

Following approval or a request to connect, or following a determination by the processor of which vehicle(s) to connect, the initial vehicle may be notified of the upcoming connection. Again, the notification may be transmitted by the processor over the connected network to an electronic device associated with the passenger of the initial vehicle. The notification may be sent to the same electronic device that made the request to connect, or a separate electronic device associated with the passenger of the initial vehicle, or a combination thereof. In certain examples, the transmission to the initial vehicle may include navigation instructions for the initial vehicle to connect to the one or more additional vehicles. Such navigation instructions may include a meeting location where the connection would occur. The meeting location may be a service station positioned in a geographic location that is optimal to both the service provider and the vehicle passengers. The service stations may include, but are not limited to: bars, restaurants, gas stations, grocery stores, pharmacies, salons, business offices, and so forth.

Alternatively, the navigation instructions may include a navigation route on which to proceed, wherein the connection may occur at any point along the navigation route where the initial vehicle and additional vehicle(s) happen to meet.

In certain examples, the additional vehicle or vehicles may also be provided with navigation instructions for connecting with the initial vehicle. Again, the navigation instructions may include a meeting location where the connection would occur. Alternatively, the navigation instructions may include a navigation route on which to proceed, wherein the connection may occur at any point along the navigation route where the initial vehicle and additional vehicle(s) happen to meet. In some examples, the initial vehicle or additional vehicle(s) navigation routes are altered in order to make the connection at an appropriate location.

III. Connection of Vehicles

Connection of the initial vehicle with one or more additional vehicles may occur in any manner now known or conceivable in the future. For example, the initial vehicle may be connected or docked with an additional vehicle between the front of the initial vehicle and back of the additional vehicles or between the back of the initial vehicle and front of the additional vehicle. Alternatively, the connection of the two vehicles may occur between opposing sides of the vehicles. Also, in some examples, a connection may be made between vehicles by placing one vehicle on a surface of or within an opening of another vehicle (e.g., driving one vehicle onto a platform of another vehicle such as a car ferry).

The process of docking or connecting the vehicles may be automated, wherein a navigation or electronic device installed or otherwise associated with a vehicle controls the process of connecting the vehicle with the one or more additional vehicles.

In some examples, the server or service provider in communication with the navigation device of the vehicle may provide navigation instructions for the connection process.

In some examples, the navigation instructions may include a particular location to connect. In one example, three vehicles may already be connected with each other at the time a fourth (initial) vehicle makes a request to connect. The server or service provider may provide navigation instructions for the fourth vehicle to connect at an outer end of a series of connected vehicles (e.g., whether it be on one side perpendicular to the direction of travel or parallel with the direction of travel, such as the tail end or at the beginning of the connected vehicles). Alternatively, the navigation instructions may include connecting the fourth vehicle in between the first and second vehicles or the second and third vehicles, wherein some of the vehicles may have to temporarily disconnect to insert the fourth vehicle in between.

The location of the connection may be based on the order or timing of the disconnection of each vehicle (based on each vehicle's provided destination). That is, the vehicles may be placed in order from front to back, back to front, or side to side based on their disconnection timing. For example, a new vehicle may be added to an outer end of a series of connected vehicles because the vehicle will be the first to disconnect. A new vehicle may be added to an outer end of the series of connected vehicles because the vehicle will be the last to disconnect. Additionally, a new vehicle may be inserted in the middle of a series of vehicles because the vehicle will not be the first or the last to disconnect.

Therefore, in some examples, the navigation instructions to connect one vehicle with one or more additional vehicles may include information regarding the location of the connection. Such navigation instructions may be transmitted to electronic devices (e.g., navigation devices) associated with all of the vehicles in the plurality of connected vehicles, or only to those vehicles affected by the connection (e.g., to the initial vehicle and the vehicle at the outer end of the series, or to the initial vehicle and the two vehicles having to temporarily disconnect for the initial vehicle to be inserted in between).

IV. Tracking Passenger while Connected

After a plurality of vehicles are connected, a passenger from one vehicle may be able to move to another vehicle or a common area between, underneath, or above the connected vehicles. As noted above, this is advantageous as the connectability of vehicles allow passengers of autonomous or highly automated driving vehicles the opportunity to connect with passengers of other vehicles for social or commercial reasons.

FIG. 1 depicts an example system 100 with a plurality of connected vehicles 102a, 102b, 102c, 102d and passengers 104a, 104b, 104c, 104d. A single passenger was originally associated with a single vehicle (i.e., passenger 104a with vehicle 102a, 104b with 102b, 104c with 102c, and 104d with 102d). As depicted in FIG. 1, upon connection of the vehicles, two passengers (104a and 104d) have moved from their respective vehicles (102a and 102d) to meet with passenger 104c in vehicle 102c.

During the connected travel, it may be useful to intermittently or continually determine the locations of the passengers. For example, the location of each passenger may be determined every 5 seconds, 10 seconds, 15 seconds, 30 seconds, 1 minute, or 5 minutes. Alternatively, a passenger location may be determined at variable times (e.g., if there are no vehicles disconnecting for 30 minutes, it may not be necessary to determine the exact location of a passenger yet).

The determined passenger location may be used in calculating when to notify a particular passenger of a planned detachment of a vehicle to travel to their provided destination. For example, the farther a passenger may be from the vehicle the passenger needs to be in to travel to their destination, the earlier a notification may be needed to alert the passenger to move vehicles.

Tracking or determining the location of each passenger may be accomplished via any currently known or future developed positioning technology. For instance, the location of a passenger may be tracked based on an electronic device (e.g., a tracking device) carried by, worn by, or otherwise attached (e.g., embedded) to the passenger. The tracking device used to provide the location of the passenger may be the same electronic device that made the request to connect or a separate electronic device associated with the passenger of the initial vehicle.

Examples of such tracking devices are described above, and include a smart phone, a mobile phone, a personal digital assistant ("PDA"), a tablet computer, a portable navigation device, vehicle navigation system, or a wearable electronic device, or any mobile electronic device having an integrated circuit that may be monitored or tracked. For instance, wearable electronic devices, car keys, house keys, or even paper documents (e.g., a boarding pass) may be configured as an electronic device that may be monitored. Such a device may be embedded with an integrated circuit and may be wirelessly connected to additional electronic devices over a connected network within the plurality of connected vehicles to keep track of the device or the holder/passenger of the device.

The tracking device may include positioning circuitry such as a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning system may also include a receiver and correlation chip to obtain a GPS signal. The tracking device may receive location data from the positioning system. Such location data obtained by the positioning circuitry may be transmitted to a service provider or separate computing device (e.g., a server having a processor) over a connected network for analysis.

Alternatively, or additionally, the tracking device may include an integrated circuit configured for short-range communication with an additional device or system within the vicinity (e.g., same vehicle) of the electronic device. For example, the tracking device may be configured to communicate over a WiFi network, personal area network (PAN), a near-me area network (NAN), a local area network (LAN), or a Bluetooth network. In some examples, the communication may be via radio wave frequencies. In one particular example, the communication network includes Bluetooth low energy (BLE) technology or a comparable technology configured to transmit small packets of information (as compared with Bluetooth Classic technology).

The tracking device may wirelessly transmit a beacon to another computing device that may include or be interpreted to include the proximity or location of an electronic device. In some examples, the beacon may include information such as a timestamp, received signal strength indicator (RSSI), or location information (e.g., an access point or global positioning coordinates). Such information may be provided in a Bluetooth Smart packet to provide a unique identifier. Such information may be relayed to a service provider or separate computing device (e.g., a server having a processor) to analyze the location of the passenger and determine when to send the passenger a notification regarding a planned disconnection of the vehicle.

V. Notifying a Passenger of Upcoming Disconnection

While the vehicles are connected, a passenger may receive a notification of a planned disconnection of a vehicle from the plurality of vehicles in order to continue traveling to the passenger's provided destination. This notification may be a personalized notification, wherein not all of the additional passengers are made aware of the planned disconnection. In other words, the notification may be sent to an electronic device associated with the specific passenger or to a device within the vicinity of the specific passenger. This is advantageous as the notification does not interrupt the other passengers with unnecessary information. That is, the planned disconnection of one passenger's vehicle does not affect their continued travel itinerary. In other words, in some examples, only those passengers involved with having to move vehicles or prepare to disconnect are affected by the notification.

The notification regarding the upcoming disconnection of a vehicle may be transmitted from the service provider or server to the affected passenger's electronic device (e.g., mobile phone, tablet computer, watch). This electronic device may be the same device or a different device from the electronic device used to request the connection and provide the navigation destination. Additionally, this electronic device used to receive the transmission from the service provider or server may be the same or different electronic device as the tracking device used to provide the location of the passenger.

Alternatively, or additionally, the notification to the passenger may be an audio or visual notification. For example, the notification may be over a speaker (e.g., loudspeaker) within a common area of the connected vehicles or within an individual vehicle. The notification may be provided on a display screen (e.g., a light-emitting diode (LED) or liquid crystal display) within a common area of the connected vehicles or within an individual vehicle. In some examples, the notification may be provided on an individual light (e.g., LED light) or series of lights (such that the message may be provided by a blinking light or pattern of lights).

The timing of when the personalized notification is transmitted may be based on one or more factors. One factor in the timing of the notification may be the time to the disconnection. For example, a notification may be provided 5 minutes, 10 minutes, or 15 minutes before a planned disconnection. The planned disconnection may be based on a calculated disconnection time (i.e., a scheduled time to disconnect, regardless of the actual location of the vehicles at the specific time), a detachment location (i.e., a scheduled location to disconnect, regardless of the time), or a hybrid thereof based on both a planned time to disconnect and an appropriate or safe detachment location.

In determining a disconnection time, a processor may analyze real-time or historic traffic conditions along the shared route to determine a particular time to disconnect based on the approximate location the vehicles will be at a specific time.

Alternatively, in determining a detachment location, the processor may identify or calculate an optimal location for disconnecting the vehicles. Similar to determining where vehicles may connect, the processor may take into consideration the various road segments and/or nodes stored within a map database to determine how long the vehicles will share a route in terms of time and/or distance. For example, road segment or node information may be used to determine what geographic location or intersection may be used for disconnecting the vehicles. In some examples, the notification to disconnect may be based on a calculated time to the detachment location. The time to the detachment location may be determined based on real-time or historic traffic conditions along the road segment(s) to the detachment location. Another factor may be a distance to the detachment location. For example, a notification may be provided 1 kilometer, 5 kilometers, or 10 kilometers before a planned detachment location.

An alternative or additional factor for the time of the notification may be based on the location of the passenger within the plurality of connected vehicles. For example, if the passenger is within the correct vehicle to be disconnected, the timing for the notification may be sooner to the time for disconnection (e.g., 1 minute before disconnection) than if the passenger was located in a different vehicle (e.g., 10 minutes before disconnection). For example, with respect to FIG. 1, passenger 104b is in vehicle 102b. If this vehicle is the designated vehicle for the passenger for disconnection, the notification time may occur within a few minutes of the actual disconnection. Alternatively, if passenger 104a needs to return to vehicle 102a, the notification time may need to occur more further in advance of the planned disconnection in comparison to passenger 104b.

This is advantageous as the variable timing for the notification allows a passenger in a different vehicle an opportunity to return to the correct vehicle by providing a notification further in advance of departure, while a passenger within the correct vehicle only really needs a notification not to change vehicles due to an imminent departure.

In some examples, the notification may include assigning a different vehicle for disconnecting than the passenger's initial vehicle used in connecting. This may be advantageous for one or more reasons. For one, each connecting vehicle may be an agnostic vehicle, freely shared among the passengers. In some examples, vehicles may be connected at the outer end of a series of vehicles, and may be disconnected from the outer end of the series, regardless of who initially used the vehicle. Instead, whichever passenger is next to disconnect from the connected vehicles is assigned to move to the first or last vehicle for disconnecting. In other examples, each connected vehicle may convert to the needs of the passenger or passengers presently located within the vehicle. In other words, instead of being instructed to move to the outer end of a series of vehicles, a passenger may be reassigned to the vehicle the passenger has chosen to occupy.

In such situations of agnostic vehicles, or a transfer of vehicle "ownership" from one passenger to another, the service provider (e.g., server) may transfer or reassign the passenger's navigation route or destination from one vehicle to another at some time prior to a disconnection of the vehicle.

Following transmittal of the notification to the passenger, the passenger may respond in several ways. In one situation, the passenger may accept the notification to move vehicles or stay within a specific vehicle to disconnect. This acceptance may be an active acceptance wherein the passenger, using their associated electronic device, provides a transmission back to the service provider or server acknowledging the acceptance. The acceptance of the notification may be passive, wherein the passenger simply moves to the correct vehicle to disconnect or remains in the vehicle that has been designated to be disconnected. No transmittal or notification is sent to the service provider or server, other than a potential location notification that the passenger is in the correct vehicle to disconnect.

In another situation, the passenger may override, revise, or otherwise reject the notification to move vehicles or to disconnect. In some cases, the passenger may be engaged in a conversation with another passenger, and would like to continue the conversation without disconnecting. Again, the action rejecting, revising, or overriding the notification may be active or passive. In an active example, the passenger may send, via an electronic device, a transmission back to the service provider or server rejecting the transmission to move vehicles or disconnect. In some examples, the passenger may be provided an option to revise his or her destination or disconnection time to a geographic location further down the navigation route, allowing the passenger a longer opportunity to remain on a shared navigation route (e.g., to continue a conversation with another passenger). In certain examples, the passenger may enter a new destination having a later disconnection time. In alternative examples, the passenger may request a delay in the time to disconnect (e.g., a request to disconnect 10 minutes later than scheduled). The request to disconnect at a certain later time may include a selection or calculation by the processor of a new destination or a revised route to the original destination.

In other examples, the overriding or rejection of a notification to disconnect is a passive situation, the passenger may choose not to move vehicles to the vehicle designated to be disconnected. In such a situation, the vehicle is not disconnected. Instead, in certain examples, the passenger's destination may be rerouted to the same destination as the other passenger(s) in the same current vehicle.

VI. Disconnecting Vehicle

When a passenger is within the correct vehicle designated to be disconnected, and no override or rejection of disconnection of the vehicle has been transmitted to the service provider, the vehicle may be disconnected. A notification or warning, like the notifications discussed above, may be transmitted to the passenger's electronic device or a speaker or display screen within the vehicle to notify the passenger of the imminent disconnection from the other vehicle(s).

VII. Flowchart Examples

Figure 2:
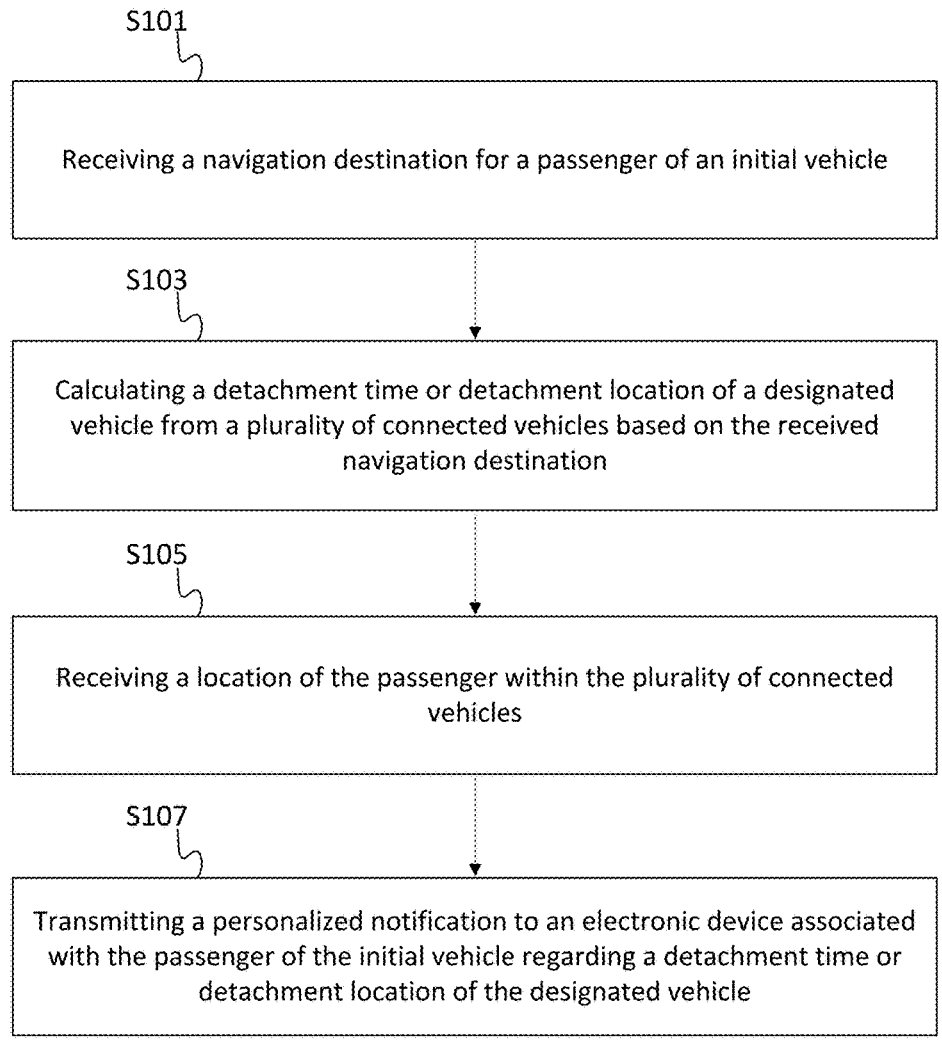
FIG. 2 illustrates an example flowchart for providing a notification regarding a planned detachment of a designated vehicle from a plurality of connected vehicles.

FIG. 2 illustrates an example flowchart for providing a notification regarding a planned detachment of a designated vehicle from a plurality of connected vehicles. The process of the flowchart may be performed by a server 125 and processor 300, which may be referred to alternatively as the controller in the following description. Alternatively, another device may be configured to perform one or more of the following acts. Additional, fewer, or different acts may be included.

In act S101, the controller receives a navigation destination for a passenger of an initial vehicle. In some examples, the receiving of the navigation destination of the passenger includes a request to connect the initial vehicle with at least one additional vehicle.

In act S103, a detachment time or detachment location of the designated vehicle from the plurality of connected vehicles is calculated based on the received navigation destination. As discussed above, a planned disconnection may be based on a calculated disconnection time (i.e., a scheduled time to disconnect, regardless of the actual location of the vehicles at the specific time), a detachment location (i.e., a scheduled location to disconnect, regardless of the time), or a hybrid thereof based on both a planned time to disconnect and an appropriate or safe detachment location. Real-time or historic traffic conditions along the shared route may be used to calculate a particular time to disconnect based on the approximate location the vehicles will be at a specific time. Alternatively, the various road segments and/or nodes stored within a map database may be used to determine how long the vehicles will share a route in terms of time and/or distance, and therein determine an appropriate detachment location. The notification to disconnect may be based on a calculated time (e.g., 1 minute, 5 minutes, 10 minutes to the location) or distance to the detachment location (e.g., 1 kilometer, 5 kilometers, 10 kilometers to the location).

In act S105, the controller receives a location of the passenger associated with the navigation destination within the plurality of connected vehicles. The location of the passenger may be determined from on an electronic device attached to, held by, or worn by the passenger. The electronic device may be a mobile phone, tablet computer, or wearable electronic device (e.g., a watch).

In act S107, a personalized notification is transmitted by the processor or controller to an electronic device associated with the passenger regarding the detachment time or detachment location of the designated vehicle from the plurality of connected vehicles. The transmission time of the personalized notification may be based upon the location of the passenger within the plurality of connected vehicles. The personalized notification may be transmitted to a speaker or display screen adjacent to the passenger. Alternatively, the personalized notification may be transmitted to an electronic device attached to, held by, or worn by the passenger.

In one or more additional acts, the processor or controller may receive an updated navigation destination of the passenger. In other examples, the processor or controller may assign or designate a passenger to a specific vehicle based on the determined location of the passenger, wherein the designated vehicle and the initial vehicle may be different vehicles. In yet other examples, the processor or controller may assign or designate a passenger to a specific vehicle based on the navigation destination of the passenger in relation to navigation destinations of other passengers within the plurality of connected vehicles.

Figure 3:
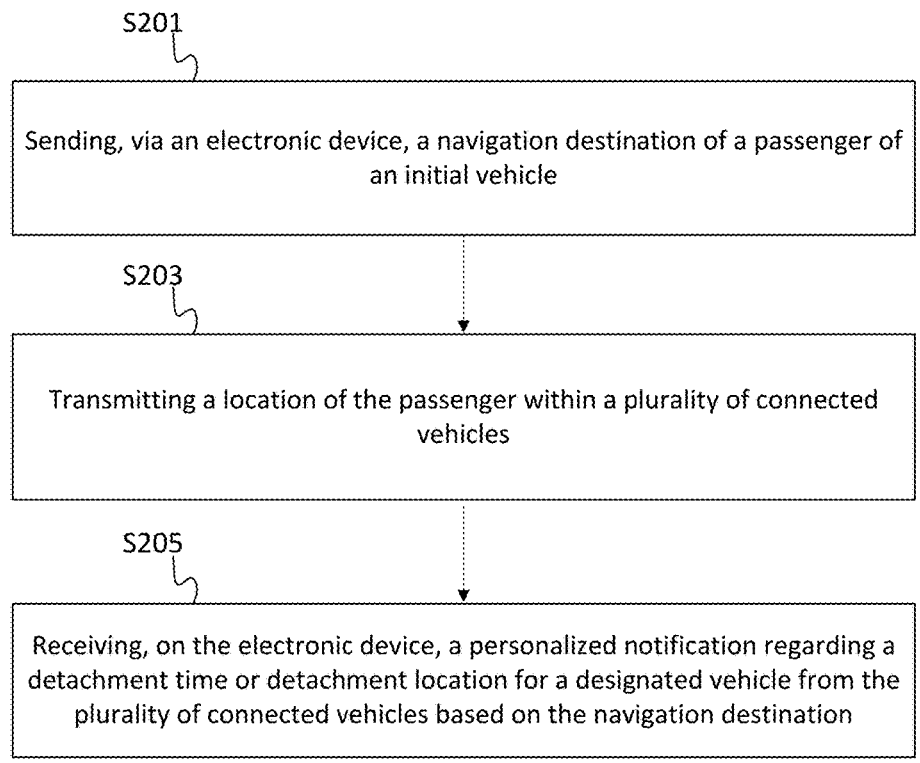
FIG. 3 illustrates an example flowchart for receiving a notification regarding a planned detachment of a designated vehicle from a plurality of connected vehicles.

FIG. 3 illustrates an additional example flowchart for receiving a notification regarding a planned detachment of a designated vehicle from a plurality of connected vehicles. The process of the flowchart may be performed by a server 125 and controller 200. Alternatively, another device may be configured to perform one or more of the following acts. Additional, fewer, or different acts may be included.

In act S201, a navigation destination for a passenger of an initial vehicle is sent or transmitted from an electronic device to a server over a connected network. In some examples, the sending of the navigation destination of the passenger includes a request to connect the initial vehicle with at least one additional vehicle.

In act S203, a location of the passenger among a plurality of connected vehicles is transmitted to the server. The location of the passenger may be determined from on an electronic device attached to, held by, or worn by the passenger.

In act S205, a same or a different electronic device receives a personalized notification regarding a detachment time or detachment location for a designated vehicle from the plurality of connected vehicles based on the sent navigation destination. In some examples, the designated vehicle and the initial vehicle are different vehicles. The transmission time of the personalized notification may be based upon the location of the passenger within the plurality of connected vehicles. The personalized notification may be transmitted to a speaker or display screen adjacent to the passenger. Alternatively, the personalized notification may be transmitted to an electronic device attached to, held by, or worn by the passenger.

In one or more additional acts, the processor or controller may transmit an updated navigation destination of the passenger.

Figure 4:
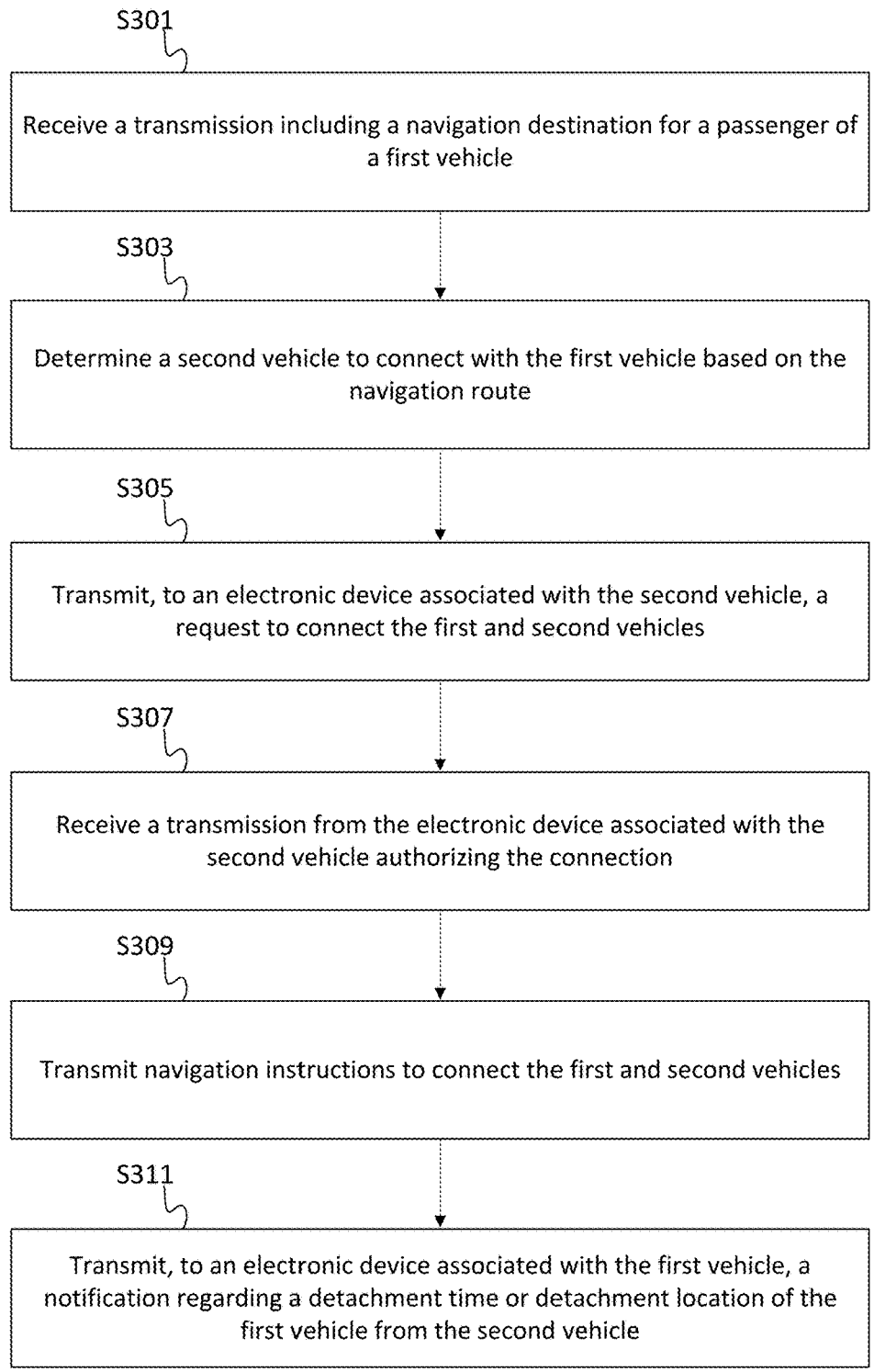
FIG. 4 illustrates an example flowchart for processing transmission requests to connect vehicles with each other.

FIG. 4 illustrates an additional example flowchart for processing a request to connect and disconnect vehicles with each other. The process of the flowchart may be performed by a server 125 and processor 300, which may be referred to alternatively as the controller in the following description. Alternatively, another device may be configured to perform one or more of the following acts. Additional, fewer, or different acts may be included.

In act S301, the processor receives a transmission comprising a navigation destination for a passenger of a first vehicle and request to connect with at least one additional vehicle. In other words, a user has transmitted a request to connect their initial vehicle with one or more additional vehicles, and the request has been received by the processor over a connected network. The processor may be associated with a service provider of a plurality of connectable vehicles. The user of the vehicle may have physically or vocally input this information into an electronic device, such as a mobile phone, tablet computer, voice recognition device, or a navigation device installed within the vehicle and transmitted the connection request to the processor. As noted above, the connectable vehicles may be autonomous or HAD vehicles.

In act S303, the processor determines, based on the received navigation route, one or more additional vehicles to connect with the first vehicle. The determination may be made based on a shared direction of travel of the plurality of vehicles. As noted above, a comparison of potentially overlapping navigation routes may take into account similar road segments and/or nodes defined within a geographic database. The processor may compare the navigation routes of the various vehicles based on the road segments and/or nodes defined within each navigation route. In some examples, the determination of which potential vehicles to connect may be based on which vehicles are within a predetermined radius or distance of the initial vehicle (e.g., within a 1 kilometer radius, 2 kilometer radius, 5 kilometer radius, 10 kilometer radius, and so on).

In act S305, a request is transmitted to an electronic device associated with the additional vehicle(s) to connect the first vehicle and the additional vehicle(s). The request may be transmitted by the processor over the connected network to one or more electronic devices associated with users or passengers of the one or more additional vehicles. This may be advantageous in allowing the passenger(s) to limit whom they connect with during their commute.

In act S307, a transmission is received from the electronic device associated with the additional vehicle(s) authorizing or declining the connection to the first vehicle. In other words, each additional vehicle may transmit a message to the processor authorizing or declining the connection to the first vehicle. In some examples, the first vehicle is only connected with the additional vehicle(s) if each additional vehicle approves the connection request. In other examples, the connection is approved if a majority of the additional vehicles approve the request. In yet other examples, the connection is approved if a predefined percentage of the additional vehicles approve the request (e.g., 60%, 70%, 80%, 90% of the additional vehicles).

In act S309, when there is an authorization to connect the vehicles, the processor transmits navigation instructions to connect the vehicles. This may include a revised navigation route to facilitate the connection or instructions to meet or wait at a specific location to connect. The notification may be transmitted by the processor over the connected network to an electronic device associated with the passenger of the initial vehicle. In certain examples, the transmission to the initial vehicle and/or the additional vehicles may include navigation instructions for the initial vehicle to connect to the one or more additional vehicles. Such navigation instructions may include a meeting location where the connection would occur. Alternatively, the navigation instructions may include a navigation route on which to proceed, wherein the connection may occur at any point along the navigation route where the initial vehicle and additional vehicle(s) happen to meet. In some examples, the initial vehicle or additional vehicle(s) navigation routes are altered in order to make the connection at an appropriate location.

In act S311, following a connection of a plurality of vehicles, the processor may transmit to an electronic device associated with one of the vehicles a detachment time or detachment location for the vehicle from the additional vehicle(s). As discussed above, the planned disconnection may be based on a calculated disconnection time, a detachment location, or a hybrid thereof based on both a planned time to disconnect and an appropriate or safe detachment location.

VIII. Devices and Systems

Figure 5:
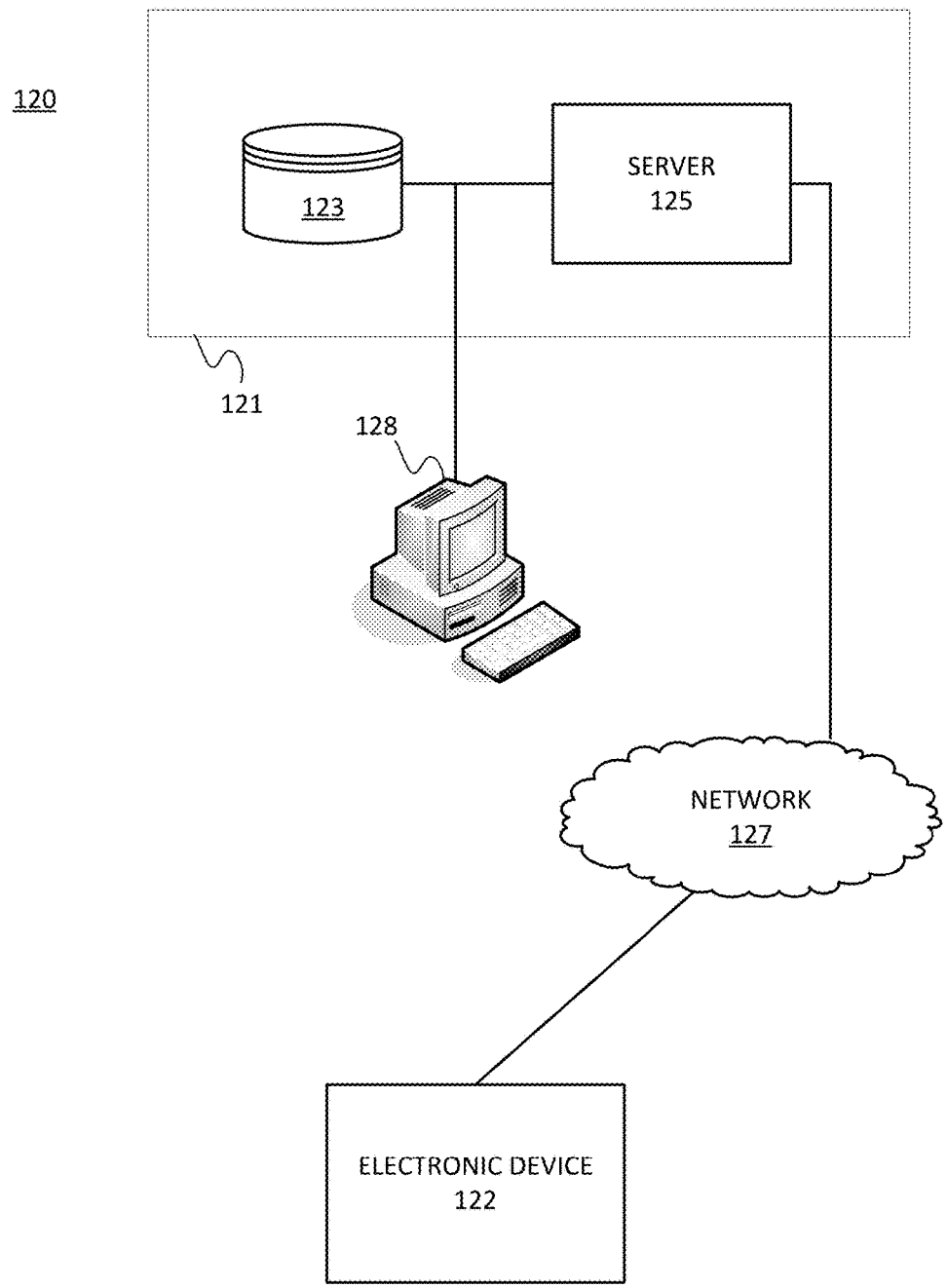
FIG. 5 illustrates an example system for transmitting notifications to and/or receiving notifications from passengers based on input from an electronic device associated with an initial vehicle.

FIG. 5 illustrates an exemplary system 120 for receiving and transmitting messages between a server/service provider and electronic devices associated with passengers of vehicles. The system 120 includes a developer system 121, at least one electronic device 122, a workstation 128, and a network 127. Additional, different, or fewer components may be provided.

As noted above, the at least one electronic device 122 may be a smart phone, a mobile phone, a personal digital assistant ("PDA"), a tablet computer, a notebook computer, a voice recognition device, a workstation, a server, a personal navigation device ("PND"), a portable navigation device, vehicle navigation system, wearable electronic device, and/or any other known or later developed mobile electronic device. In some examples, the electronic device may be any mobile device of interest to be monitored or tracked. For instance, wearable electronic devices, car keys, house keys, or even paper documents (e.g., a boarding pass) may be configured as an electronic device having an integrated circuit. In certain examples, the at least one electronic device 122 is installed or transported in or on a vehicle (e.g., car, truck, motorcycle, bicycle, bus) or transported on a traveler. In certain examples, the navigation device 122 generates a message that provides the device's geographic location and sends the message to the server 125.

The developer system 121 includes a server 125 and a database 123. The developer system 121 may include computer systems and networks of a system operator. The server database 123 may be configured to store information regarding the various passengers/users of the vehicles. For example, the database 123 may store information regarding various groups of passengers that automatically authorize the connection of their vehicle with other group members.

In certain examples, the database 123 is a full copy of the geographic database, and in another example, the local copy of the database 123 may be a cached or partial portion of the geographic database. The cached portion may be defined based on a geographic location of the electronic device 122 or a user selection made at the electronic device 122.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

Each road segment may be associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data may include a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the electronic device 122, or at an external location.

The developer system 121, the workstation 128, and the at least one electronic device 122 are coupled with the network 127. The phrase "coupled with" is defined to mean directly connected to or indirectly connected through one or more intermediate components. Such intermediate components may include hardware and/or software-based components.

The optional workstation 128 may be a general purpose computer including programming specialized for providing input to the server 125. For example, the workstation 128 may provide settings for the server 125. The settings may include a value for the predetermined interval that the server 125 requests the device 122 to relay current geographic locations. The workstation 128 may be used to enter data indicative of Global Positioning System (GPS) accuracy to the database 123. The workstation 128 may include at least a memory, a processor, and a communication interface.

Figure 6:
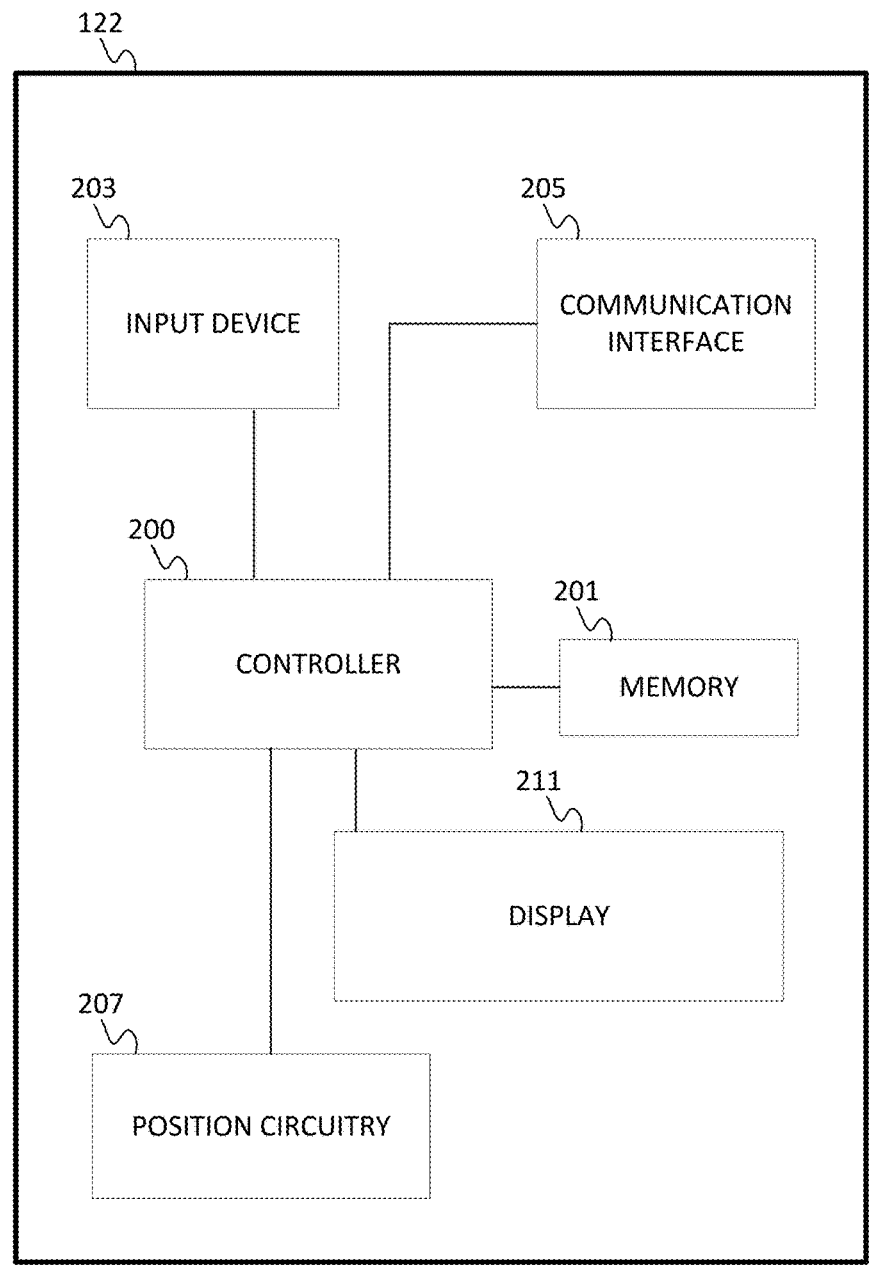
FIG. 6 illustrates an exemplary electronic device of the system of FIG. 5.

FIG. 6 illustrates an exemplary electronic device 122 of the system of FIG. 5. The electronic device 122 includes a controller 200, a memory 204, an input device 203, a communication interface 205, position circuitry 207, and a display 211. Additional, different, or fewer components are possible for the device 122.

The controller 200 is configured to receive data indicative of the location of the device 122 from the position circuitry 207. The positioning circuitry 207, which is an example of a positioning system, is configured to determine a geographic position of the device 122. The positioning circuitry 207 may include sensing devices that measure the traveling distance, speed, direction, and so on, of the electronic device 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the electronic device 122. The positioning system may also include a receiver and correlation chip to obtain a GPS signal. The electronic device 122 receives location data from the positioning system. The location data indicates the location of the electronic device 122.

Figure 7:
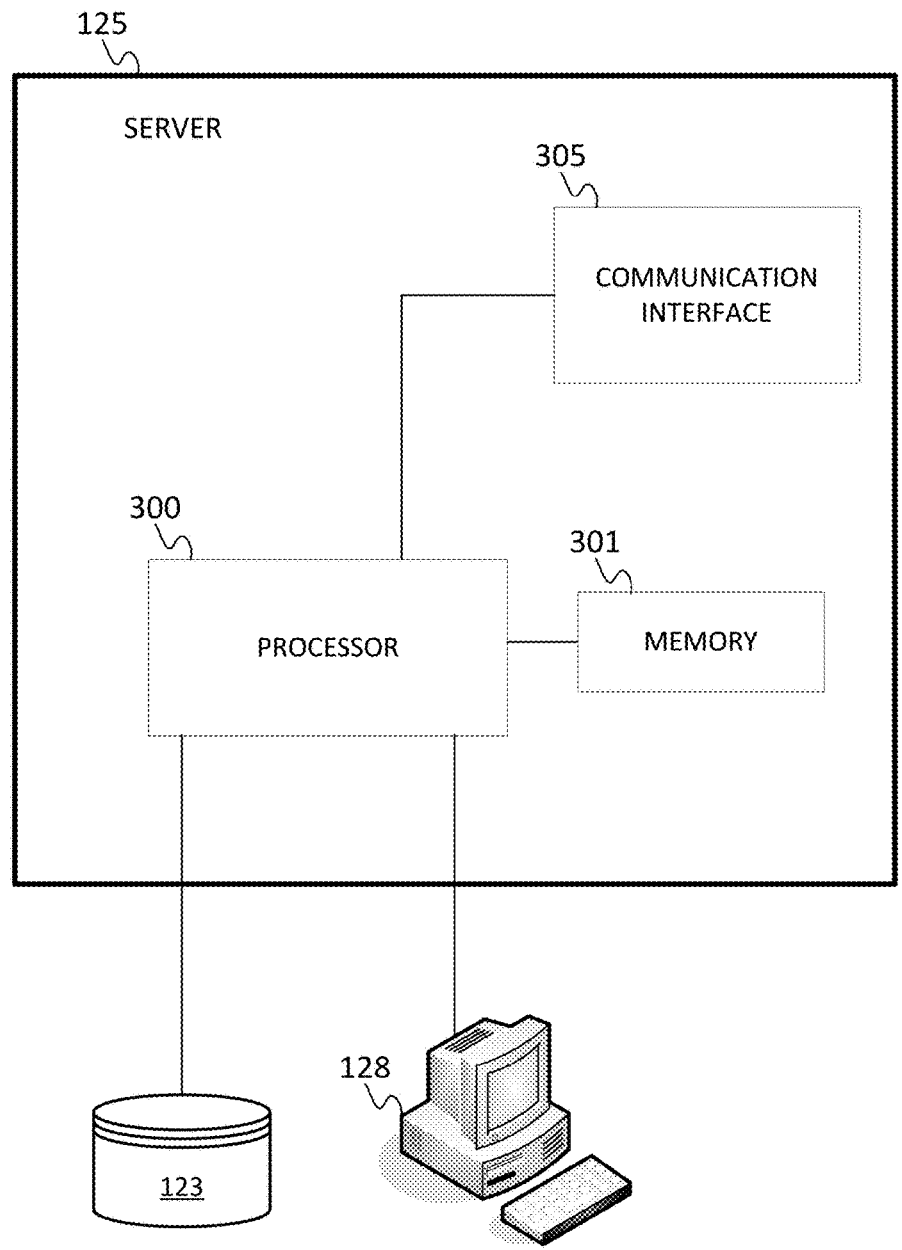
FIG. 7 illustrates an exemplary server of the system of FIG. 5.

FIG. 7 illustrates an exemplary server 125 of the system of FIG. 5. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. The communication interface 305 receives data indicative of use inputs made via the workstation 128 or the at least one electronic device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 may also be configured to cause an electronic device to at least perform at least one of the methods described above. For example, the controller may be configured to: (1) send a navigation destination of a passenger to a processor 300; (2) transmit a location of the passenger within a plurality of connected vehicles; and/or (3) receive from the processor 300 a personalized notification regarding a detachment time or detachment location for a designated vehicle.

The processor 300 may also be configured to cause an apparatus or server to at least perform at least one of the methods described above. For example, the controller or processor may be configured to perform the process: (1) receive a navigation destination for a passenger of an initial vehicle; (2) calculate a detachment time or detachment location of a designated vehicle based on the received navigation destination; (3) receive a location of the passenger within the plurality of connected vehicles; and/or (4) transmit a personalized notification to an electronic device associated with the passenger regarding a detachment time or detachment location of the designated vehicle.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described examples, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement one or more of the methods described herein. Applications that may include the apparatus and systems of various examples can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the claim scope or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the claim scope. The claims should not be read as limited to the described order or elements unless stated to that effect. Therefore, all embodiments that come within the scope and spirit of the following claims and equivalents thereto are claimed.

IX. Claim Support Section

The following example embodiments are also disclosed.

Embodiment 1

A method for providing a notification regarding a planned detachment of a designated vehicle from a plurality of connected vehicles, the method comprising: receiving a navigation destination for a passenger of an initial vehicle; calculating, by a processor, a detachment time or detachment location of the designated vehicle from the plurality of connected vehicles based on the received navigation destination; and transmitting, by the processor, a personalized notification to an electronic device associated with the passenger regarding the detachment time or detachment location of the designated vehicle from the plurality of connected vehicles.

Embodiment 2

The method of embodiment 1, further comprising: receiving a location of the passenger associated with the navigation destination within the plurality of connected vehicles, wherein a transmission time of the personalized notification is based upon the location of the passenger within the plurality of connected vehicles.

Embodiment 3

The method of embodiment 2, wherein the location of the passenger is based on an electronic device attached to, held by, or worn by the passenger.

Embodiment 4

The method of any of embodiments 1-3, further comprising, following the transmitting of the personalized notification: receiving an updated navigation destination of the passenger.

Embodiment 5

The method of any of embodiments 1-4, further comprising: receiving a location of the passenger within the plurality of connected vehicles; and assigning, by the processor, the passenger to the designated vehicle based on the location of the passenger, wherein the designated vehicle and the initial vehicle are different vehicles.

Embodiment 6

The method of any of embodiments 1-5, further comprising: assigning, by the processor, the passenger to the designated vehicle to be detached based on the navigation destination of the passenger in relation to navigation destinations of other passengers within the plurality of connected vehicles.

Embodiment 7

The method of any of embodiments 1-6, wherein the personalized notification is transmitted to a speaker or display screen adjacent to the passenger.

Embodiment 8

The method of any of embodiments 1-7, wherein the personalized notification is transmitted to an electronic device attached to, held by, or worn by the passenger.

Embodiment 9

The method of any of embodiments 1-8, wherein the electronic device is a mobile phone, tablet computer, or watch.

Embodiment 10

The method of any of embodiments 1-9, wherein each vehicle of the plurality of connected vehicles is an autonomous or highly-automated driving vehicle.

Embodiment 11

The method of any of embodiments 1-10, wherein the receiving of the navigation destination of the passenger comprises a request to connect the initial vehicle with at least one additional vehicle to provide the plurality of connected vehicles, and wherein, following the receiving of the navigation destination, the method further comprises: transmitting, by the processor, to an electronic device associated with each vehicle of the at least one additional vehicle, a notification of the request to connect; and receiving a transmission from each electronic device of the at least one additional vehicle approving or declining the request to connect.

Embodiment 12

A method for receiving a notification regarding a planned detachment of a designated vehicle from a plurality of connected vehicles, the method comprising: sending, via an electronic device, a navigation destination of a passenger of an initial vehicle; receiving on the electronic device, following a connection of the initial vehicle with at least one additional vehicle to provide the plurality of connected vehicles, a personalized notification regarding a detachment time or detachment location for the designated vehicle from the plurality of connected vehicles based on the navigation destination.

Embodiment 13

The method of embodiment 12, further comprising: transmitting a location of the passenger within the plurality of connected vehicles, wherein a transmission time of the personalized notification is based upon the location of the passenger within the plurality of connected vehicles.

Embodiment 14

The method of embodiment 13, wherein the location of the passenger is based on the electronic device attached to, held by, or worn by the passenger.

Embodiment 15

The method of embodiment 14, further comprising, following the receiving of the personalized notification: sending, via the electronic device, an updated navigation destination of the passenger.

Embodiment 16

The method of any of embodiments 14-15, wherein the electronic device is a mobile phone, tablet computer, or watch.

Embodiment 17

The method of any of embodiments 12-16, wherein the sending of the navigation destination of the passenger comprises a request to connect the initial vehicle with the at least one additional vehicle.

Embodiment 18

An apparatus for processing transmission requests to connect vehicles with each other, the apparatus comprising: at least one processor; and at least one memory including computer program code for one or more programs; the at least one memory and the computer program code configured to, with the at least one processor, cause the apparatus to at least perform: receive a transmission comprising a navigation destination for a passenger of a first vehicle and request to connect with at least one additional vehicle; determine, based on the received navigation route, a second vehicle to connect with the first vehicle; transmit, to an electronic device associated with the second vehicle, a request to connect the first vehicle and the second vehicle; and receive a transmission from the electronic device associated with the second vehicle authorizing or declining the connection of the first vehicle and the second vehicle.

Embodiment 19

The apparatus of embodiment 18, wherein the electronic device associated with the second vehicle has authorized the connection, and wherein the at least one memory and the computer program code are configured to cause the apparatus to further perform: transmit navigation instructions to connect the first vehicle and the second vehicle.

Embodiment 20

The apparatus of any of embodiments 18-19, wherein, following a connection of the first vehicle and the second vehicle, the at least one memory and the computer program code are configured to cause the apparatus to further perform: transmit, to an electronic device associated with the first vehicle, a notification regarding a detachment time or detachment location of the first vehicle from the second vehicle.

What is claimed is:

1. A method for providing a notification regarding a planned vehicle detachment, the method comprising:
    connecting at least a first vehicle and a second vehicle as a plurality of connected vehicles;
    receiving a navigation destination for a passenger;
    receiving a location within the plurality of connected vehicles, from a position sensor, of the passenger associated with the navigation destination;
    calculating, by a processor, a detachment time or detachment location of the second vehicle from the plurality of connected vehicles based on the received navigation destination; and
    transmitting, by the processor, at a transmission time in response to a distance from the second vehicle to the location of the passenger within the plurality of connected vehicles, a personalized notification to an electronic device associated with the passenger regarding the detachment time or detachment location of the second vehicle from the plurality of connected vehicles.

2. The method of claim 1, wherein the location of the passenger is based on an electronic device attached to, held by, or worn by the passenger.

3. The method of claim 1, further comprising, following the transmitting of the personalized notification:
    receiving an updated navigation destination of the passenger.

4. The method of claim 1, wherein the personalized notification is transmitted to a speaker or display screen adjacent to the passenger.

5. The method of claim 1, wherein the personalized notification is transmitted to an electronic device attached to, held by, or worn by the passenger.

6. The method of claim 5, wherein the electronic device is a mobile phone, tablet computer, or watch.

7. The method of claim 1, wherein the receiving of the navigation destination of the passenger comprises a request to connect the first vehicle with at least one additional vehicle to provide the plurality of connected vehicles, and wherein, following the receiving of the navigation destination, the method further comprises:
    transmitting, by the processor, to an electronic device associated with each vehicle of the at least one additional vehicle, a notification of the request to connect; and
    receiving a transmission from each electronic device of the at least one additional vehicle approving or declining the request to connect.

8. The method of claim 1, wherein the first vehicle is an autonomous or highly-automated driving vehicle.

9. A method for providing a notification regarding a planned vehicle detachment, the method comprising:
    connecting at least a first vehicle and a second vehicle as a plurality of connected vehicles, wherein each vehicle of the plurality of connected vehicles is an autonomous or highly-automated driving vehicle;
    receiving a navigation destination for a passenger;
    receiving a location, from a position sensor, of the passenger associated with the navigation destination;
    calculating, by a processor, a detachment time or detachment location of the second vehicle from the plurality of connected vehicles based on the received navigation destination; and
    transmitting, by the processor, in response to the location of the passenger, a personalized notification to an electronic device associated with the passenger regarding the detachment time or detachment location of the second vehicle from the plurality of connected vehicles.

10. A method for receiving a notification regarding a planned vehicle detachment, the method comprising:
    connecting at least a first vehicle and a second vehicle as a plurality of connected vehicles, wherein each of the first vehicle and the second vehicle is an autonomous or highly-automated driving vehicle;
    sending, via an electronic device, a navigation destination of a passenger;
    detecting, via a position sensor, a location of the passenger associated with the navigation destination within the plurality of connected vehicles; and
    receiving on the electronic device, based on the location of the passenger, a personalized notification regarding a detachment time or detachment location for the second vehicle from the plurality of connected vehicles based on the navigation destination.

11. The method of claim 10, wherein the location of the passenger is based on the electronic device attached to, held by, or worn by the passenger.

12. The method of claim 11, further comprising, following the receiving of the personalized notification:
   sending, via the electronic device, an updated navigation destination of the passenger.

13. The method of claim 11, wherein the electronic device is a mobile phone, tablet computer, or watch.

14. The method of claim 10, wherein the sending of the navigation destination of the passenger comprises a request to connect the first vehicle with the second vehicle.

15. A non-transitory computer readable medium including instructions that when executed are configured to perform a method comprising:
   receiving a request to dock a first vehicle and a second vehicle, wherein each of the first vehicle and the second vehicle is an autonomous or highly-automated driving vehicle;
   receiving a navigation destination for a passenger;
   docking the first vehicle to the second vehicle in response to the navigation destination;
   receiving, from a position sensor, a location of the passenger associated with the navigation destination within the first vehicle;
   calculating, by a processor, a detachment time or detachment location of the second vehicle from the first vehicle based on the received navigation destination; and
   transmitting, by the processor, in response to the location of the passenger, a personalized notification to an electronic device associated with the passenger regarding the detachment time or detachment location of the second vehicle from the first vehicle.

16. The non-transitory computer readable medium of claim 15, wherein the location of the passenger is based on the electronic device attached to, held by, or worn by the passenger.

17. The non-transitory computer readable medium of claim 15, wherein the personalized notification is transmitted to a speaker or display screen adjacent to the passenger.

18. The non-transitory computer readable medium of claim 15, wherein the electronic device is a mobile phone, tablet computer, or watch.

19. The non-transitory computer readable medium of claim 15, wherein the second vehicle is an autonomous vehicle.

20. The non-transitory computer readable medium of claim 15, wherein the second vehicle is a highly-automated vehicle.

* * * * *